United States Patent
Nahir et al.

(10) Patent No.: US 9,804,911 B2
(45) Date of Patent: Oct. 31, 2017

(54) CONCURRENT VALIDATION OF HARDWARE UNITS

(71) Applicant: APPLE INC., Cupertino, CA (US)

(72) Inventors: Amir Nahir, Haifa (IL); Randal S. Thelen, Cupertino, CA (US); Yair Dagan, Haifa (IL); Yuval Gonczarowski, Haifa (IL)

(73) Assignee: APPLE INC., Cupertino, CA (US)

( * ) Notice: Subject to any disclaimer, the term of this patent is extended or adjusted under 35 U.S.C. 154(b) by 16 days.

(21) Appl. No.: 14/722,239

(22) Filed: May 27, 2015

(65) Prior Publication Data

US 2016/0350163 A1    Dec. 1, 2016

(51) Int. Cl.
*G06F 11/00* (2006.01)
*G06F 11/07* (2006.01)
*G06F 11/263* (2006.01)

(52) U.S. Cl.
CPC ........ *G06F 11/079* (2013.01); *G06F 11/0736* (2013.01); *G06F 11/0751* (2013.01); *G06F 11/263* (2013.01)

(58) Field of Classification Search
USPC .......................................................... 714/33
See application file for complete search history.

(56) References Cited

U.S. PATENT DOCUMENTS

| | | | |
|---|---|---|---|
| 6,415,406 B1 * | 7/2002 | Kaiser | G11C 29/14 714/30 |
| 6,615,167 B1 * | 9/2003 | Devins | G06F 11/261 703/14 |
| 6,678,645 B1 | 1/2004 | Rajsuman et al. | |
| 6,934,897 B2 | 8/2005 | Mukherjee et al. | |
| 7,089,534 B2 | 8/2006 | Hartman et al. | |
| 7,543,200 B2 | 6/2009 | Pramanick et al. | |
| 7,945,418 B2 | 5/2011 | Bose et al. | |
| 7,945,888 B2 | 5/2011 | Adir et al. | |
| 8,230,265 B2 * | 7/2012 | Rajashekara | G06F 11/3676 714/38.11 |
| 8,479,129 B1 | 7/2013 | Kalyanaraman et al. | |
| 8,516,229 B2 | 8/2013 | Adir et al. | |
| 8,694,276 B2 | 4/2014 | Sontakke et al. | |

(Continued)

FOREIGN PATENT DOCUMENTS

GB    2506825 A    4/2014

OTHER PUBLICATIONS

Adir et al., "Threadmill: A Post-Silicon Exerciser for Multi-Threaded Processors", Proceedings of the 48th Design Automation Conference (DAC), pp. 860-865, Jun. 5-10, 2011.

Storm et al., "Random Test Generators for Microprocessor Design Validation", Proceedings of the 8th EMICRO, 59 pages, May 12, 2006.

(Continued)

*Primary Examiner* — Amine Riad
(74) *Attorney, Agent, or Firm* — D.Kligler IP Services Ltd.

(57) ABSTRACT

A method includes holding a definition of multiple software-implemented tests for testing one or more hardware units of an Integrated Circuit (IC), and of invocation conditions that specify whether the tests are permitted to run. The tests are applied to the hardware units at least partially in parallel, using a processor in the IC, by repeatedly tracking respective execution states of the tests and evaluating the invocation conditions, and invoking a test that currently does not run but is permitted to run in accordance with the invocation conditions.

17 Claims, 4 Drawing Sheets

(56) References Cited

U.S. PATENT DOCUMENTS

| | | | | |
|---|---|---|---|---|
| 8,943,377 B2* | 1/2015 | Harper | ............... | G06F 11/3089 714/718 |
| 2005/0102580 A1* | 5/2005 | House | ............... | G06F 11/2294 714/38.14 |
| 2005/0102594 A1* | 5/2005 | Dey | ............... | G01R 31/31704 714/733 |
| 2011/0099424 A1* | 4/2011 | Rivera Trevino | ..... | G06F 11/263 714/25 |
| 2014/0133253 A1* | 5/2014 | Chuang | ............... | G11C 29/12 365/201 |
| 2014/0184200 A1* | 7/2014 | Milano | ............... | G01R 33/072 324/202 |
| 2014/0237291 A1 | 8/2014 | Elston et al. | | |
| 2015/0185279 A1* | 7/2015 | Milano | ............. | G01R 31/2884 324/750.3 |

OTHER PUBLICATIONS

Adir et al.,"Concurrent Generation of Concurrent Programs for Post-Silicon Validation", IEEE Transactions on CAD of Integrated Circuits and Systems, vol. 31, issue 8, pp. 1297-1302, Aug. 2012.

Kadry et al., "Comparative Study of Test Generation Methods for Simulation Accelerators", Proceedings of the 2015 Design, Automation & Test in Europe Conference & Exhibition, pp. 321-324, 2015.

"Real-time computing"—Wikipedia, the free encyclopedia, 6 pages, Apr. 9, 2015 https://en.wikipedia.org/wiki/Real-time_operating_system.

"Scheduling (computing)"—Wikipedia, the free encyclopedia, 11 pages, Apr. 7, 2015 https://en.wikipedia.org/wiki/Scheduling_(computing).

* cited by examiner

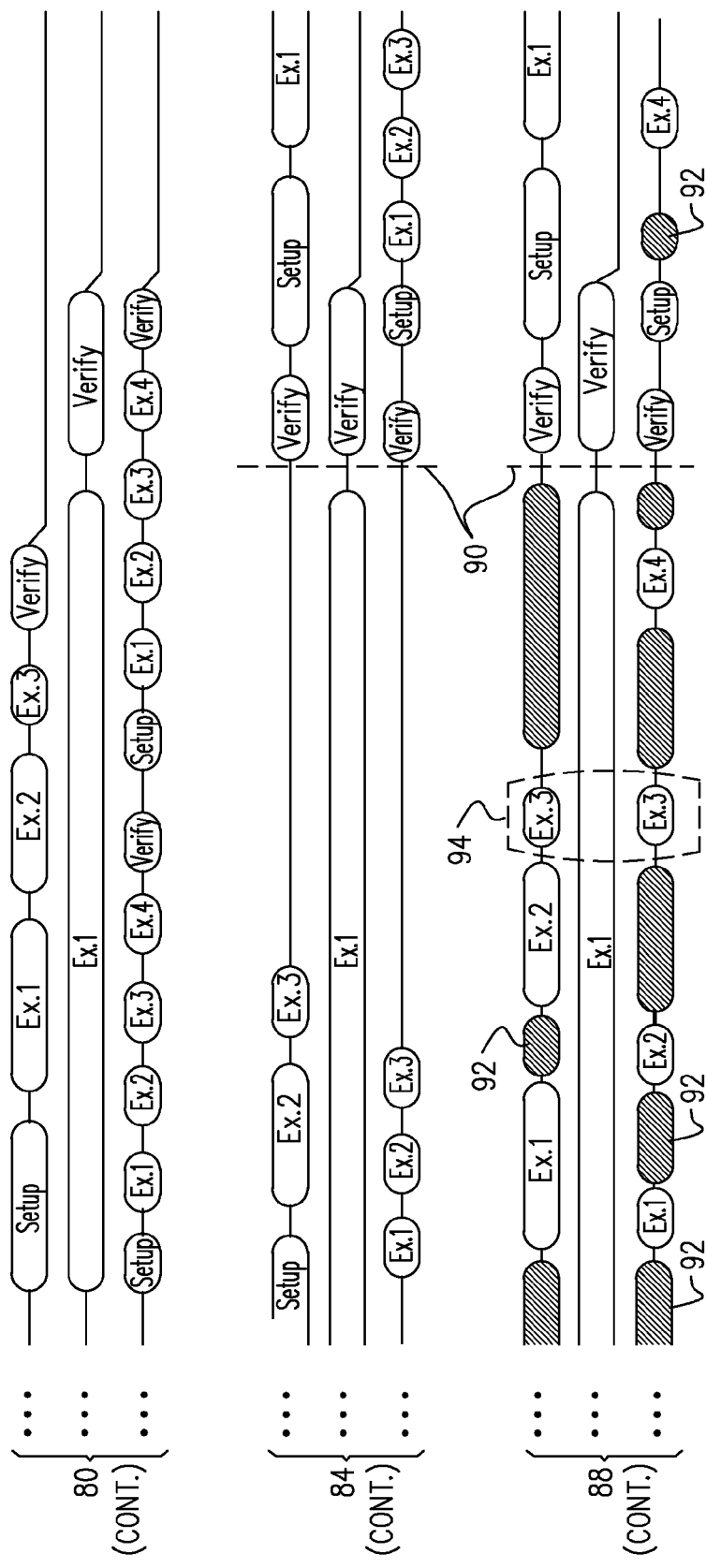

CONCURRENT VALIDATION OF HARDWARE UNITS

TECHNICAL FIELD

Embodiments described herein relate generally to hardware validation, and particularly to methods and systems for concurrent validation of Integrated Circuit (IC) hardware units.

BACKGROUND

Various techniques for validation of Integrated Circuit (IC) design are known in the art. Some techniques, sometimes referred to as post-silicon validation, test the design in its hardware form. For example, Adir et al. describe techniques for post-silicon validation, targeting multi-threaded processors, in "Threadmill: a Post-Silicon Exerciser for Multi-Threaded Processors," Proceedings of the 48$^{th}$ Design Automation Conference (DAC), Jun. 5-10, 2011, pages 860-865, which is incorporated herein by reference. Examples of schemes for random test generation are described by Storm, in "Random Test Generation for Microprocessor Design Validation," Proceedings of the 8$^{th}$ EMI-CRO, May 12, 2006, which is incorporated herein by reference. Concurrent test generation is also addressed by Adir et al., in "Concurrent Generation of Concurrent Programs for Post-Silicon Validation," IEEE Transactions on CAD of Integrated Circuits and Systems, volume 31, issue 8, 2012, which is incorporated herein by reference.

U.S. Pat. No. 7,945,888, whose disclosure is incorporated herein by reference, describes a method that includes building an executable image of a hardware exerciser adapted for execution on a test platform. The exerciser image includes embedded data corresponding to architectural knowledge, testing knowledge, and a test template. The test template is defined in a context-free formal language and includes biasing directives to influence at least one of a desired test structure, one or more resources to be included in the test, and one or more values of the included resources. The architectural knowledge is obtained from an architectural model including a formal description of the specification for the system-under-test, and the testing knowledge is obtained from a testing knowledgebase including heuristics for testing desired aspects of the system-under-test.

U.S. Pat. No. 8,516,229, whose disclosure is incorporated herein by reference, describes a test code generation technique that generates an output set of program code by replacing a particular instruction with a redirecting instruction for redirecting execution to a handling routine. When the redirection instruction is reached, the handling routine is entered. The handling routine determines a state of the processor such that a desired result of the particular instruction is selected by specifying a replacement instruction having the desired result when executed and replacing the redirection instruction with the replacement instruction. The program code is then re-executed, either immediately or on a next iteration, so that the replacement instruction generates the desired result when executed.

SUMMARY

An embodiment that is described herein provides a method including holding a definition of multiple software-implemented tests for testing one or more hardware units of an Integrated Circuit (IC), and of invocation conditions that specify whether the tests are permitted to run. The tests are applied to the hardware units at least partially in parallel, using a processor in the IC, by repeatedly tracking respective execution states of the tests and evaluating the invocation conditions, and invoking a test that currently does not run but is permitted to run in accordance with the invocation conditions.

In some embodiments, one or more of the tests are partitioned into phases, and the invocation conditions specify whether each of the phases is permitted to run. In an embodiment, executing the tests includes running each test, or each predefined test phase, in its entirety when invoked. In a disclosed embodiment, applying the tests includes learning actual execution durations of one or more of the tests, and adjusting an invocation time of at least one of the tests based on the actual execution durations, so as to diversify a stress pattern applied to the hardware units.

There is additionally provided, in accordance with an embodiment that is described herein, an Integrated Circuit (IC) including one or more hardware units and a processor. The processor is configured to hold a definition of multiple software-implemented tests for testing the hardware units, and of invocation conditions that specify whether the tests are permitted to run, and to apply the tests to the hardware units at least partially in parallel, by repeatedly tracking respective execution states of the tests and evaluating the invocation conditions, and invoking a test that currently does not run but is permitted to run in accordance with the invocation conditions.

There is further provided, in accordance with an embodiment that is described herein, a computer software product including a tangible non-transitory computer-readable medium in which program instructions are stored. The instructions, when read by a processor in an Integrated Circuit (IC), cause the processor to hold a definition of multiple software-implemented tests for testing one or more hardware units of the IC, and of invocation conditions that specify whether the tests are permitted to run, and to execute the tests at least partially in parallel, by scheduling the tests on the processor in accordance with the invocation conditions.

There is also provided, in accordance with an embodiment that is described herein, a method including executing multiple software-implemented tests for testing one or more hardware units of an Integrated Circuit (IC). Actual execution durations of one or more of the tests are learned automatically, and an invocation time of at least one of the tests is adjusted based on the learned actual execution durations, so as to diversify a stress pattern applied to the hardware units. In some embodiments, adjusting the invocation time includes inserting an artificial delay between invocations associated with the one of the tests.

There is additionally provided, in accordance with an embodiment that is described herein, an Integrated Circuit (IC) including one or more hardware units and a processor. The processor is configured to execute multiple software-implemented tests for testing the hardware units, to automatically learn actual execution durations of one or more of the tests, and to adjust an invocation time of at least one of the tests based on the learned actual execution durations, so as to diversify a stress pattern applied to the hardware units.

There is also provided, in accordance with an embodiment that is described herein, a computer software product including a tangible non-transitory computer-readable medium in which program instructions are stored. The instructions, when read by a processor in an Integrated Circuit (IC), cause the processor to execute multiple software-implemented tests for testing one or more hardware units of the IC, to automatically learn actual execution durations of one or more of the tests, and to adjust an invocation time of at least one of the tests based on the learned actual execution durations, so as to diversify a stress pattern applied to the hardware units.

These and other embodiments will be more fully understood from the following detailed description of the embodiments thereof, taken together with the drawings in which:

BRIEF DESCRIPTION OF THE DRAWINGS

FIGS. 5A and 5B illustrate timing diagrams of concurrent test schedules, in accordance with another embodiment that is described herein.

DETAILED DESCRIPTION OF EMBODIMENTS

Overview

Embodiments that are described herein provide improved methods and systems for post-silicon validation of Integrated Circuits (ICs). In the disclosed embodiments, an IC to be tested comprises one or more CPUs and one or more hardware units. The hardware units controlled by a given CPU are tested using test software that comprises a set of software-implemented tests and a scheduler, all uploaded and configured to run on the CPU.

In some embodiments, each test (or each predefined phase of a test) is configured to run in its entirety when invoked. The test software further comprises one or more invocation conditions that specify when each test (or phase) is permitted to run. The scheduler repeatedly evaluates the invocation conditions, selects the next test (or phase) that is ready to run and invokes it.

Since each test (or phase) runs from beginning to end when invoked, there is no need for the scheduler to suspend and resume tests in order to parallelize them. As such, there is no need to maintain complex context information for each test. The disclosed techniques are therefore highly efficient in utilizing the (often limited) CPU and memory resources of the tested IC, and incur only small overhead for parallelizing the test.

Moreover, in many practical cases a given CPU controls a large number of hardware units and has only limited computational power and memory. The disclosed techniques enable the execution of multiple concurrent tests, even though the tests and scheduler run entirely on the existing CPU and memory.

In some embodiments, the scheduler is configured to monitor and learn the actual execution durations of the various tests (or phases of tests). Based on the actual execution durations, the scheduler adjusts one or more of the test invocation times, in order to better diversify the stress patterns applied to the various hardware units. By adjusting test invocation times, the scheduler may eliminate unintentional synchronization patterns between tests, or intentionally create synchronization between tests. Either way, the disclosed technique enables the scheduler to diversify the stress patterns with which the tests stimulate the hardware units. The scheduler may adjust the invocation times, for example, by inserting artificial delays before or between tests or test phases.

System Description

Figure 1:
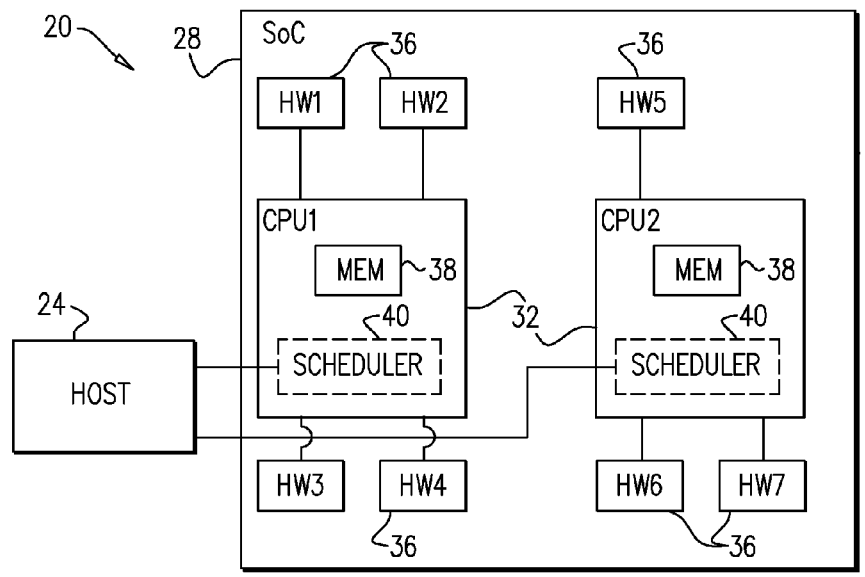
FIG. 1 is a block diagram that schematically illustrates a system for testing a System-on-Chip (SoC), in accordance with an embodiment that is described herein.

FIG. 1 is a block diagram that schematically illustrates a system 20 for testing an Integrated Circuit (IC), in the present example a System-on-Chip (SoC) 28, in accordance with an embodiment that is described herein. SoC 28 comprises one or more hardware units 36, and one or more processors 32 (also referred to as Central Processing Units—CPUs). In the present example, SoC 28 comprises seven hardware units denoted HW1 . . . HW7, and two CPUs denoted CPU1 and CPU2, such that CPU1 controls HW1 . . . HW4 and CPU2 controls HW5 . . . HW7.

SoC 28 may comprise any suitable type of SoC that is designed to perform any suitable functions in any suitable system. In one example embodiment, SoC 28 comprises a signal-processing SoC designed for use in a mobile phone or mobile computing device. In this embodiment, hardware units 36 may comprise, for example, a video decoder/encoder, an error correction or encryption module, a modem or a memory controller, to name just a few examples. Other examples of hardware units may comprise a Direct Memory Access (DMA) engine, a Digital Signal Processor (DSP) or an image processing unit. Generally, any suitable hardware units may be tested using the disclosed techniques.

System 20 comprises a host 24 that uploads test software and definitions to CPUs 32 for testing hardware units 36, and receives test results from the CPUs. The test software uploaded to a given CPU 32 comprises a scheduler 40 that runs on the CPU. The functions of scheduler 40 and of the test software in general are explained in detail below.

In some embodiments, each CPU 32 comprises a respective memory 38 used for storing software code and/or data during normal operation. During testing, the same memory 38 holds the test software and definitions provided by host 24, test results for returning to the host, and/or any other suitable data. Test results may be exported from SoC 28, for example, using one of the SoC interfaces, such as a Universal Asynchronous receiver/transmitter (UART). In the example of FIG. 1 memory 38 comprises an internal memory of the CPU. Alternatively, however, memory 38 may comprise an external memory.

In some embodiments, a given CPU 32 comprises a programmable processor capable of executing software for carrying out the functions described herein. The software may be downloaded to the processor in electronic form, over a network, for example, or it may, alternatively or additionally, be provided and/or stored on non-transitory tangible media, such as magnetic, optical, or electronic memory.

Concurrent Execution of Tests without Context Switching

In some embodiments, the test software that runs on CPU 32 comprises two main components—Multiple tests, and a scheduler 40. Each test comprises a software module that runs on CPU 32 and is configured to stimulate and test one of hardware units 36. Scheduler 40 comprises a software module that runs on CPU 32 and is configured to invoke the various tests.

In an embodiment, each test is configured to run from beginning to end when invoked, i.e., is not suspended or resumed during execution. In some embodiments, a given test is divided into two or more phases, and each phase is configured to run from beginning to end when invoked. Thus, there is typically no need for scheduler 40 to store a context per test, and to perform context switching when running the tests. Nevertheless, scheduler 40 may still maintain some minimal-size contexts for the tests.

In some embodiments, the test software further specifies one or more invocation conditions. A test is considered "permitted to run" if and only if its corresponding invocation conditions are met. Typically, scheduler 40 carries out a repetitive process of evaluating the various invocation conditions, selecting the next test to be executed based on the evaluated conditions, and invoking the selected test. This repetitive process is able to parallelize execution of the tests, and thus test SoC 28 under heavy load conditions. At the same time, since the process does not involve context switching, the computational and memory overhead incurred in alternating among the multiple tests is small.

Scheduler 40 may use any suitable type of invocation conditions to decide whether a test is permitted to run. An example condition may comprise, for example, a hardware event such as an interrupt or hardware signal. Another example condition may specify that a certain value is written into a given memory location. Yet another example condition may specify that a certain time-out (e.g., hardware timer) has expired. Additionally or alternatively, any other suitable invocation conditions can be used.

When a given test is divided into phases, scheduler 40 typically regards each phase as a separate test having its own invocation conditions. One of the invocation conditions for invoking a certain phase is that the previous phase is completed.

In some embodiments, scheduler 40 and each of the tests interact via a suitable interface. The interface enables the test to notify the scheduler of the invocation conditions that should be met in order for the test to be ready to be invoked again. Additionally or alternatively, the interface may enable the scheduler to poll the test for determining whether the test is ready to run again. This mechanism is also regarded as a way of evaluating invocation conditions by the scheduler.

The interface between the scheduler and each test may also enable the scheduler to notify the test of the invocation conditions that are met upon its invocation. As the test is executed repeatedly from its beginning, this notification is needed for the test to determine its correct execution path.

Various changes in the overall system state may cause a test to be ready to be invoked again. State changes may be triggered by, for example, completion of some action by some hardware unit 36 (that may in turn be reflected by an interrupt or a change to some memory value), an action by another test (e.g., the other test writing a value to memory that the current test needs in order to be ready to run again), expiry of some time-out, to name just a few examples.

In some embodiments, scheduler 40 maintains a respective state machine that tracks the execution state of each test. Initially, the state machine is initialized to some initial state. With each execution of the test, the scheduler examines the current state of the test, and executes suitable logic that initiates a phase of the test that is appropriate for the current state.

When the overall system state changes with respect to the hardware unit 36 being tested by the test in question, the state machine of the test is set to a state consistent with the hardware unit. Then, when the test is executed again, scheduler 40 again examines the current state, and again executes the appropriate logic to initiate the next phase of the test, and so on. This process continues until the test is regarded complete.

Figure 2:
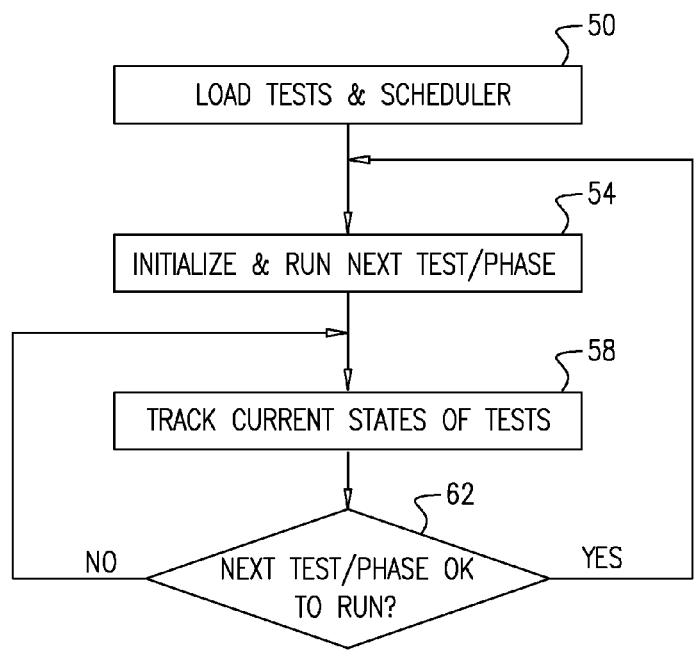
FIG. 2 is a flow chart that schematically illustrates a method for testing a SoC, in accordance with an embodiment that is described herein.

FIG. 2 is a flow chart that schematically illustrates a method for testing SoC 28, in accordance with an embodiment that is described herein. Without loss of generality, the description refers to a single CPU 32 and a single scheduler, for the sake of clarity.

The method begins with host 24 uploading the test software (comprising scheduler 40, and a definition of tests and invocation conditions) to CPU 32, at a loading step 50.

At an invocation step 54, scheduler 40 selects and invokes the next test (or the next phase) to run. As explained above, selection is based on evaluating the appropriate invocation conditions. At a state tracking step 58, scheduler 40 examines the current execution states of the various tests.

Based on the current execution states, scheduler 40 checks whether some subsequent test or phase is ready to run, at a checking step 62. If so, the method loops back to step 54 above for invoking the next test or phase. Otherwise, the method loops back to step 58 for continuing to track the execution states of the tests.

Figure 3:
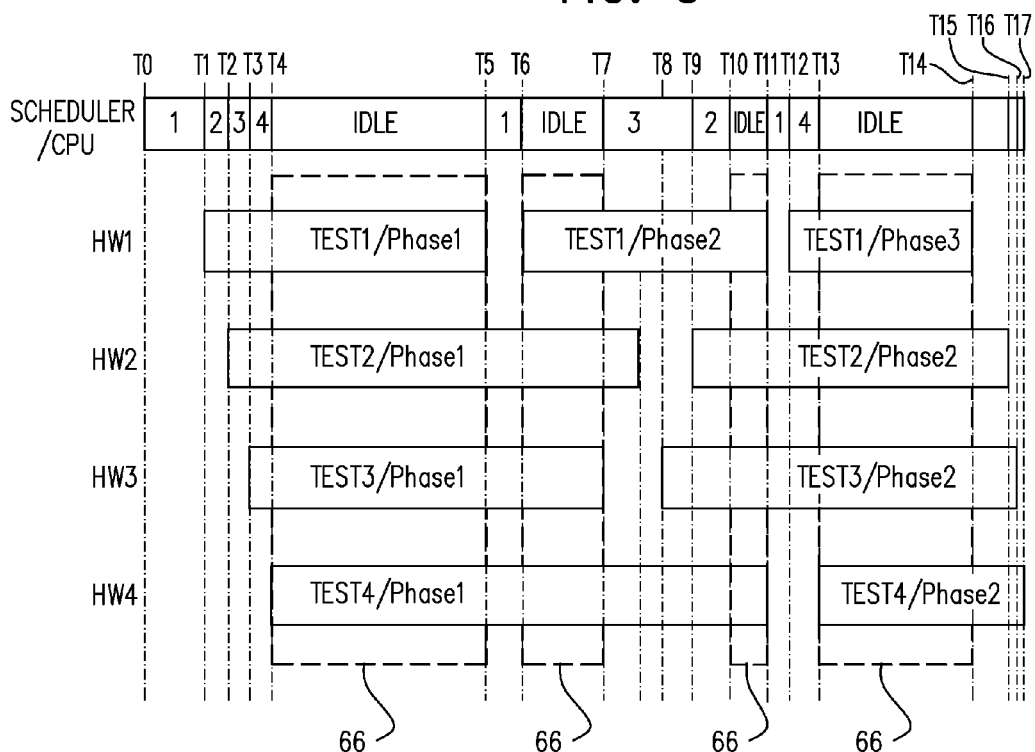
FIG. 3 is a timing diagram of a concurrent test schedule, in accordance with an embodiment that is described herein.

FIG. 3 is a timing diagram of a concurrent test schedule, in accordance with an embodiment that is described herein. The example of FIG. 3 demonstrates the effectiveness of the disclosed technique in parallelizing test execution, given the limited computation and memory resources of SoC 28.

In the present example, scheduler 40 runs on CPU1 32 for testing hardware units HW1 . . . HW4 at least partially in parallel. A test denoted TEST1 is configured to test HW1 and is divided into three phases. Tests denoted TEST2, TEST3 and TEST 4 are configured to test HW2, HW3 and HW4, respectively, and are each divided into two phases. When a tested hardware unit completes execution of a given phase of a given test, the hardware unit triggers an interrupt to the CPU 32.

The top timeline in the figure (denoted "SCHEDULER/CPU") shows which software module runs on CPU 32 at each point in time. Intervals marked "1", "2", "3" and "4" denote intervals in which the CPU 32 runs code (referred to as SW1, SW2, SW3 and SW4) that provisions and invokes the various phases of TEST1, TEST2, TEST3 and TEST4, respectively. At other times, the CPU 32 is marked "IDLE".

The other four timelines in the figure show the utilization of the various hardware units (HW1 . . . HW4) as a result of the disclosed scheduling scheme. Time periods in which the tests activate all four hardware concurrently are marked by frames 66. During these periods, maximum stress can be achieved. At other times, only a subset of the hardware units is actively tested. Specifically:

At time T0, all tests are ready to execute on the CPU 32. The scheduler grants access to the CPU 32 to SW1 to prepare the first phase of its test.

At time T1, SW1 completes the setup, and HW1 begins to operate. At this stage, SW1 returns control to the scheduler that in turn grants CPU 32 access to SW2.

At time T2, SW2 completes the setup, and HW2 begins to operate. At this stage, SW2 returns control to the scheduler that in turn grants CPU 32 access to SW3.

At time T3, SW3 completes the setup, and HW3 begins to operate. At this stage, SW3 returns control to the scheduler that in turn grants CPU 32 access to SW4.

At time T4, SW4 completes the setup, and HW4 begins to operate. At this stage, SW4 returns control to the scheduler. Since no test is ready to execute code on the CPU 32, the CPU 32 becomes idle.

At time T5, phase1 of TEST1 completes, so TEST1 is granted access to the CPU 32 to prepare phase2.

At time T6, SW1 completes the setup of phase2 and HW1 begins operating again. At this stage, SW1 returns control to the scheduler. Since no test is ready to execute code on the CPU 32, the CPU 32 becomes idle.

At time T7, phase1 of TEST3 completes, so TEST3 is granted access to the CPU 32 to prepare phase2.

At time T8, phase1 of TEST2 completes. Since SW3 is still using the CPU 32, SW2 waits.

At time T9, SW3 completes the setup of phase2 and HW3 begins operating again. At this stage, SW3 returns control to the scheduler that in turn grants CPU 32 access to SW2.

At time T10, SW2 completes the setup of phase2 and HW2 begins operating again. At this stage, SW2 returns control to the scheduler. Since no test is ready to execute code on the CPU 32, the CPU 32 becomes idle.

At time T11, both phase2 of TEST1 and phase 1 of TEST4 complete, so both tests are ready to run on the CPU 32 again. The scheduler decides to grant access to the CPU 32 to TEST1 to prepare phase3.

At time T12, SW1 completes the setup, and HW1 begins to operate. At this stage, SW1 returns control to the scheduler that in turn grants CPU 32 access to SW4.

At time T13, SW4 completes the setup, and HW4 begins to operate. At this stage, SW4 returns control to the scheduler. Since no test is ready to execute code on the CPU 32, the CPU 32 becomes idle.

At time T14, TEST1 ends.

At time T15, TEST2 ends.

At time T16, TEST3 ends.

At time T17, TEST4 ends.

The scenario of FIG. 3 is an example scenario that is chosen purely for the sake of conceptual clarity. In alternative embodiments, the disclosed techniques can be used for parallelizing tests in any other suitable scenario.

Diversifying Test Stress Patterns Based on Learning of Actual Execution Durations In some embodiments, scheduler 40 is configured to control the relative synchronization between tests by occasionally adjusting the invocation times of one or more of the tests or test phases. In the disclosed embodiments, scheduler 40 automatically monitors and learns the actual execution durations of the various tests or test phases. The scheduler then adjusts one or more of the invocation times based on the learned execution durations. Consequently, the stress patterns applied to hardware units 36 are diversified considerably.

Scheduler 40 may adjust the invocation times in any suitable way. In an example embodiment, the scheduler adjusts an invocation time associated with a given test by inserting one or more artificial delays before or between invocations associated with that test.

Figure 4:
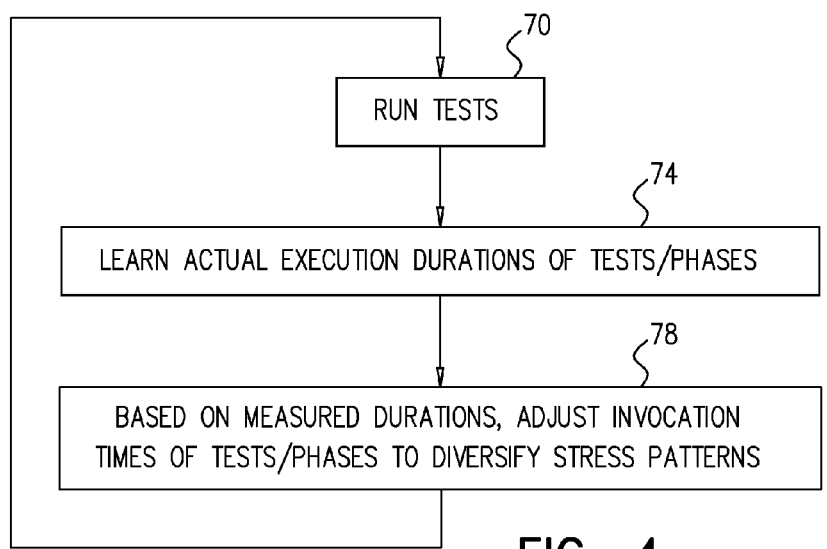
FIG. 4 is a flow chart that schematically illustrates a method for testing a SoC, in accordance with another embodiment that is described herein.

FIG. 4 is a flow chart that schematically illustrates a method for testing SoC 28, in accordance with an embodiment that is described herein. The method begins with scheduler 40 executing multiple tests for stimulating and testing hardware units 36, at an execution step 70. Initially, the scheduler may schedule the tests in accordance with any suitable scheduling scheme, e.g., Round-Robin (RR), priority-based RR, or other suitable scheduling scheme.

At a learning step 74, scheduler 40 learns timing information relating to the actual execution of the tests. The timing information may comprise, for example, the number of test phases in each test, the actual execution durations of one or more of the tests or test phases, or any other suitable information. In an example embodiment, the scheduler uses some hardware clock to count the number of clock cycles from the time the test (or test phase) is invoked until the test (or test phase) reports completion.

At an adjustment step 78, scheduler 40 adjusts one or more invocation times of a test or test phase based on the learned execution durations. In one embodiment, the scheduler adjusts an invocation time of a test or test phase by waiting a certain number of clock cycles before the invocation. The delay may be inserted at any suitable position, e.g., before the first execution phase (between "Setup" and "Ex.1"—See FIGS. 5A and 5B below) or between successive phases. The process of FIG. 4 is typically performed repeatedly, possibly with varying delays.

In some embodiments, scheduler 40 may decide which invocation to delay, and/or set the length of the artificial delay, based on the learned actual execution durations. Consider, for example, a scenario having two tests—A test denoted Test1 having three test phases, and a test denoted Test2 having two test phases. In this example, scheduler 40 finds (at learning step 74) that Test1 (including all three phases) ends before the first phase of Test2 ends. In response, the scheduler may decide to insert long delays between the phases of Test1, in order to test a situation in which HW1 (tested by Test1) is active while the second phase of Test2 is running.

Figure 5A:
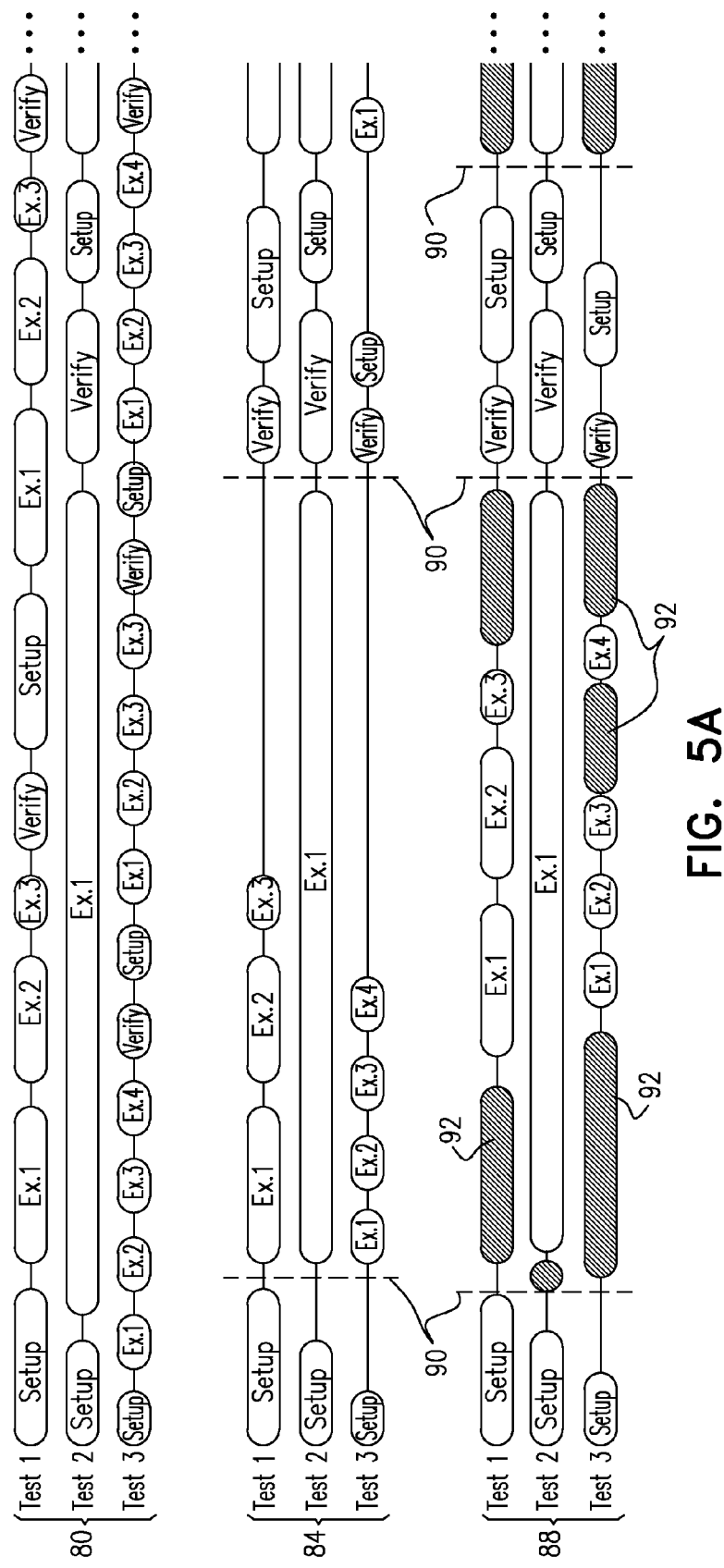

FIGS. 5A and 5B illustrate timing diagrams of concurrent test schedules, in accordance with an embodiment that is described herein. The time lines of the timing diagrams begin in FIG. 5A and continue in FIG. 5B. In the present example, scheduler 40 executes three tests denoted test1, test2 and test3. Each test comprises a setup stage (denoted "Setup"), followed by an execution stage comprising one or more execution phases (denoted "Ex.1", "Ex.2", etc.), and finally a verification stage (denoted "Verify"). Scheduler 40 executes each of the tests repeatedly, i.e., re-invokes the setup stage of a given test as soon as the verification step of the previous iteration of the given test is completed.

In the setup stage, the test and hardware unit are being prepared for the execution of the test, including, for example, allocation of memory and partial configuration of the hardware module. In the execution stage, the test stimulates the hardware unit. In the verification stage, the test results are verified and the hardware unit is configured for subsequent operation.

Different tests may comprise different operations at each of the various stages, and the execution durations of the various stages and phases may vary from test to test and within a test. In a typical implementation, the execution durations of the setup and verification stages are considerably longer than that of the execution stage. In a typical example, only ~3.5% of the time is spent at the execution stage. The execution durations shown in FIGS. 5A and 5B intentionally show these times not in proportion, in order to focus on the execution stages that are of more interest.

A schedule 80, at the top of the figures, shows a conventional schedule that does not employ any synchronization or de-synchronization means. A schedule 84, at the middle of the figures, shows another conventional schedule in which the scheduler enforces synchronization among the tests using synchronization barriers 90. In such a solution, the scheduler waits until all tests reach the stage specified in the synchronization barrier, and only then invokes the next stages of all tests.

A schedule 88, at the top of the figures, shows the disclosed technique of adjusting invocation times based on learned execution durations. As can be seen in schedule 88, scheduler 40 occasionally inserts artificial delays 92 (marked with a shaded pattern in the figures) between invocations. In the present example, a frame 94 shows that the execution phases Ex. 3 of test1 and test3 become synchronized as a result of delays 92. This stress pattern would not have occurred otherwise, and indeed does not occur in schedules 80 and 84 above.

The description above refers to a single scheduler 40 that controls the tests. As explained above, in some embodiments SoC 28 may comprise multiple CPUs 32 that run multiple respective schedulers 40. In such embodiments, schedulers 40 may coordinate their operations and timing, so as to jointly carry out the diversification scheme of FIGS. 4, 5A and 5B.

Although the embodiments described herein mainly address hardware validation, the methods and systems described herein can also be used in other applications, such as in software testing of distributed programs. In such applications, the disclosed scheduling techniques may be used to diversify the scheduling of software threads on a CPU, so as to trigger different races or collisions between the software threads.

It will thus be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An Integrated Circuit (IC), comprising:
   one or more hardware units on a chip; and
   at least one processor, on the chip, which is configured to hold a definition of multiple software-implemented tests for testing the one or more hardware units, and of corresponding invocation conditions that specify whether the corresponding tests are permitted to run, and to apply the tests to the one or more hardware units for execution at least partially in parallel, by repeatedly tracking respective execution states of the tests and evaluating the corresponding invocation conditions of the tests, and invoking a test that currently does not run but is permitted to run in accordance with its corresponding invocation conditions,
   wherein at least one of the invocation conditions indicates that a corresponding test is permitted to run only if a specific interrupt occurred, a specific hardware signal was received, a certain value was written to a given memory location or a certain time-out has expired,
   wherein the at least one processor is configured to learn actual execution durations of one or more of the tests, and to adjust an invocation time of at least one of the tests based on the actual execution durations, so as to diversify a stress pattern applied to the hardware units.

2. The IC according to claim 1, wherein one or more of the tests are partitioned into phases, and wherein the invocation conditions specify whether each of the phases is permitted to run.

3. The IC according to claim 1, wherein the at least one processor is configured to run each test, or each predefined test phase, in its entirety when invoked.

4. The IC according to claim 1, wherein the processor is configured to adjust the invocation time by inserting an artificial delay between invocations associated with the one of the tests.

5. The IC according to claim 1, wherein at least one of the invocation conditions indicates that a corresponding test is permitted to run only if a specific interrupt occurred.

6. The IC according to claim 1, wherein at least one of the invocation conditions indicates that a specific hardware signal was received.

7. The IC according to claim 1, wherein at least one of the invocation conditions indicates that a certain value was written to a given memory location.

8. The IC according to claim 1, wherein at least one of the invocation conditions indicates that a certain time-out has expired.

9. A method, comprising:
   holding in at least one processor on a chip of an Integrated Circuit (IC), a definition of multiple software-implemented tests for testing one or more hardware units on the chip of the Integrated Circuit (IC), and of corresponding invocation conditions that specify whether the corresponding tests are permitted to run; and
   applying the tests to the one or more hardware units for execution at least partially in parallel, by the at least one processor in the IC, by repeatedly tracking respective execution states of the tests and evaluating the corresponding invocation conditions of the tests, and invoking a test that currently does not run but is permitted to run in accordance with its corresponding invocation conditions,
   wherein at least one of the invocation conditions indicates that a corresponding test is permitted to run only if a specific interrupt occurred, a specific hardware signal was received, a certain value was written to a given memory location or a certain time-out has expired,
   wherein applying the tests comprises learning actual execution durations of one or more of the tests, and adjusting an invocation time of at least one of the tests based on the actual execution durations, so as to diversify a stress pattern applied to the hardware units.

10. The method according to claim 9, wherein one or more of the tests are partitioned into phases, and wherein the invocation conditions specify whether each of the phases is permitted to run.

11. The method according to claim 9, wherein executing the tests comprises running each test, or each predefined test phase, in its entirety when invoked.

12. The method according to claim 9, wherein adjusting the invocation time comprises inserting an artificial delay between invocations associated with the one of the tests.

13. The method according to claim 9, wherein at least one of the invocation conditions indicates that a corresponding test is permitted to run only if a specific interrupt occurred.

14. The method according to claim 9, wherein at least one of the invocation conditions indicates that a specific hardware signal was received.

15. The method according to claim 9, wherein at least one of the invocation conditions indicates that a certain value was written to a given memory location.

16. The method according to claim 9, wherein at least one of the invocation conditions indicates that a certain time-out has expired.

17. A tangible non-transitory computer-readable medium in which program instructions are stored, which instructions, when read by one or more processors in an Integrated Circuit (IC) on a chip, cause the one or more processors to hold a definition of multiple software-implemented tests for testing one or more hardware units on the chip of the IC, and of corresponding invocation conditions that specify whether the corresponding tests are permitted to run, and to execute the tests at least partially in parallel, by repeatedly evaluating the corresponding invocation conditions of the tests, and invoking a test that currently does not run but is permitted to run in accordance with its corresponding invocation conditions, wherein at least one of the invocation conditions indicates that a corresponding test is permitted to run only if a specific interrupt occurred, a specific hardware signal was received, a certain value was written to a given memory location or a certain time-out has expired, wherein executing the tests comprises learning actual execution durations of one or more of the tests, and adjusting an invocation time of at least one of the tests based on the actual execution durations, so as to diversify a stress pattern applied to the hardware units.

* * * * *